United States Patent
Le Paih et al.

(10) Patent No.: US 10,117,440 B2
(45) Date of Patent: Nov. 6, 2018

(54) STABILIZED MEAT PRODUCTS

(71) Applicants: MAREL TOWNSEND FURTHER PROCESSING B.V., Boxmeer (NL); MAREL FRANCE, Baud (FR)

(72) Inventors: Jacques Le Paih, Plumeliau (FR); Yohann Pierre, Baud (FR); Fabrice Le Pabic, Camors (FR); Leon Marie Francois Spierts, Maastricht (NL); Patricia Rosa Maria Hoekstra-Suurs, Berghem (NL); Johannes Marinus Quirinus Kools, Oudenbosch (NL); Johannes Martinus Meulendijks, Deurne (NL)

(73) Assignees: Marel Townsend Further Processing B.V., Av Boxmeer (NL); Marel France, Baud (FR)

( * ) Notice: Subject to any disclaimer, the term of this patent is extended or adjusted under 35 U.S.C. 154(b) by 828 days.

(21) Appl. No.: 14/412,635

(22) PCT Filed: Jul. 4, 2013

(86) PCT No.: PCT/NL2013/050498
§ 371 (c)(1),
(2) Date: Jan. 2, 2015

(87) PCT Pub. No.: WO2014/007630
PCT Pub. Date: Jan. 9, 2014

(65) Prior Publication Data
US 2015/0157032 A1 Jun. 11, 2015

(30) Foreign Application Priority Data

Jul. 4, 2012 (NL) .................................... 2009121
Feb. 15, 2013 (FR) .................................... 13 51337

(51) Int. Cl.
| A22C 13/00 | (2006.01) |
| A23P 30/25 | (2016.01) |
| A23L 29/20 | (2016.01) |
| A23L 29/231 | (2016.01) |
| A23L 29/256 | (2016.01) |
| A23L 29/262 | (2016.01) |
| A23L 29/281 | (2016.01) |
| A23L 13/60 | (2016.01) |

(52) U.S. Cl.
CPC ...... *A22C 13/0016* (2013.01); *A22C 13/0006* (2013.01); *A23L 13/60* (2016.08); *A23L 29/20* (2016.08); *A23L 29/231* (2016.08); *A23L 29/256* (2016.08); *A23L 29/262* (2016.08); *A23L 29/281* (2016.08); *A23L 29/284* (2016.08); *A23P 30/25* (2016.08)

(58) Field of Classification Search
CPC .... A22C 13/0016; A23P 30/25; A23L 29/256; A23L 29/281
USPC ........................................................ 426/573
See application file for complete search history.

(56) References Cited

U.S. PATENT DOCUMENTS

| 3,504,639 | A | | 4/1970 | Lilien |
| 3,556,969 | A | | 1/1971 | Jun |
| 3,851,355 | A | | 12/1974 | Hughes |
| 4,193,167 | A | | 3/1980 | Orlowski et al. |
| 4,212,609 | A | | 7/1980 | Fay |
| 4,642,847 | A | | 2/1987 | Ross |
| 4,987,643 | A | | 1/1991 | Powers et al. |
| 5,989,609 | A | | 11/1999 | Kobussen |
| 6,153,234 | A | * | 11/2000 | Kobussen .......... A22C 13/0016 426/105 |
| 6,235,328 | B1 | | 5/2001 | Morgan |
| 2008/0317915 | A1 | * | 12/2008 | Hu ..................... A22C 13/0016 426/277 |

FOREIGN PATENT DOCUMENTS

| FR | 2491734 A1 | 4/1982 |
| FR | 2538223 A1 | 6/1984 |
| GB | 2259043 A | 3/1993 |
| NL | 6909339 A | 12/1969 |
| WO | 99/55165 A1 | 11/1999 |
| WO | 00/30458 | 6/2000 |
| WO | 02/15715 A1 | 2/2002 |
| WO | 2006/35238 A2 | 12/2006 |
| WO | 2011/088444 A1 | 7/2011 |

* cited by examiner

Primary Examiner — Jyoti Chawla
(74) Attorney, Agent, or Firm — Zarley Law Firm, P.L.C.

(57) ABSTRACT

The present invention relates to a method for preparing food products by means of processing food particles with a gelling agent, comprising the processing steps of: a) providing a food particles; b) providing a viscous gelling agent; c) treating the viscous gelling agent with an acidic buffer solution; and d) bringing at least a part of the food particles in contact with the viscous gelling agent. The present invention further relates to a device for performing this method, to the obtained food product and the use of an acidic buffer solution for stabilizing food products.

38 Claims, 8 Drawing Sheets

STABILIZED MEAT PRODUCTS

BACKGROUND OF THE INVENTION

The present invention relates to a method for preparing food products by means of processing food particles with a gelling agent, a device suitable for performing the above described method, a food product obtainable with the method of the present invention and the use of an acidic buffer solution for stabilizing food products.

The general principle of producing foods by means of extrusion is already known in the prior art. It has become possible by means of extrusion to manufacture foods with a specific composition and shape at a relatively high production speed. Extrusion is particularly a commonly used method in the production of sausage.

A particular form of extrusion is so-called co-extrusion. The principle of co-extrusion in food products is described in, among others, Netherlands patent NL 6909339. This document describes the coating of a strand of food dough with a coating layer of collagen by means of co-extrusion. Following extrusion the coated strand is guided for strengthening purposes through a coagulation bath. Under the influence of the coagulation solution the collagen coagulates and/or precipitates and the coating layer is strengthened. A strand of food dough is thus formed which is at least partially coated with a strong coating layer of collagen, i.e. casing.

Extruded food may also be used in moulding machines for moulding three-dimensional products from a meat mass or the like. International patent application WO 00/30458 A1 describes various methods and moulding machines for moulding products. For example, U.S. Pat. No. 4,987,643 describes a moulding machine of the 'slide-plate' type, for the purpose of producing portions of hamburger meat. Another known type of moulding machine for meat products and the like is the 'turret-type', see for example U.S. Pat. No. 4,193,167. Additionally, extruded food may also be used in 'rotating drum type' moulding machines. See for examples of 'rotating drum type' moulding machines U.S. Pat. No. 3,504,639, U.S. Pat. No. 3,851,355, U.S. Pat. No. 4,212,609, GB 2,259,043, FR 2,491,734 and FR 2,538223. In case of using moulding methods for producing food products, the extruded food fed to the mould cavities of the moulding machine must have a suitable viscosity to reduce the filling pressure needed to fill the mould cavities with a sufficient amount of extruded food. In order to change the viscosity of the extruded food during the moulding process, collagen might be used.

In addition to proteins such as collagen, use is often also made in the food industry of polysaccharides, such as alginate, as coating agent for foods such as for instance sausage. The term "alginate" refers to a group of naturally occurring polysaccharides extracted from seaweed. In the presence of alkaline earth metals (such as, among others, magnesium and calcium) alginates can form gels relatively easily. Collagen and alginate may also be used in combination as it is described in International patent application WO 2006/135238 A2.

Studies have shown that the gelling of alginates under the influence of for instance calcium results due to the development of a three-dimensional structure. This is also referred to as the so-called egg-box model. When alginate is transformed into this three-dimensional structure, a relatively strong gel is created. Such a gel is highly suited to serve as coating layer of, for instance, a sausage or in providing extruded food products suitable for moulding machines.

In the co-extrusion practice a coating layer of alginate is often extruded onto a food dough strand in the making of sausage. The coating layer of the at least partly coated strand is then strengthened. Guiding the extruded and coated strand through a salt bath containing calcium provides the strengthening. Due to the presence of the calcium the coating agent, e.g. the alginate, will gel quickly and a strong gel coating layer forms on the food dough strand.

In the moulding practice alginate or collagen is used to provide extruded food having a preferred viscosity. The extruded food may be strengthened subsequently by providing calcium to the food product.

A drawback however is that the initial strength of the alginate gel is weakened over time, e.g. 24 hours, due to metal chelating agents (e.g. phosphates) present in the food dough dissolving the divalent ion, e.g. calcium, which is bound to the gelling agent. The removal of divalent ions from the gel causes the gelling agent to swell and to disrupt. In worst cases the gel disappears completely and consequently the co-extruded food or moulded food is no longer stable and falls apart.

An additional drawback of the alginate gel known in the art is that the gel as such does not adhere to the food dough. As a consequence the cooking characteristics of a co-extruded food product, e.g. sausage, are such that during cooking the gel coating does not shrink together with the food dough and that the cooking heat is not distributed through the food. This results in a heat build-up in the gel coating which causes unwanted deformation and discoloration of the coating due to evaporation of the moisture in the coating. Furthermore, air bubbles may form between the food dough and the casing during cooking, which results in a less attractive product and/or insufficient cooking at least locally.

The cooking characteristics of a moulded food product, e.g. hamburger, may be such that the product easily falls apart.

In view of the above there is a need to stabilize and increase the strength of moulded food products and/or co-extruded food products wherein alginate gel is applied to the co-extruded food dough to enhance storage duration. Increasing the amount of divalent ions, e.g. calcium, strontium, barium or combinations thereof, has been provided in the prior art. However, an increased amount of divalent ions result in variations in taste, e.g. bitter taste, possibly a relatively high salt consumption and corrosion of the equipment.

Furthermore, there is a need of increasing the adherence between the gelling agent and the food dough together in order to increase the cooking characteristics of the food product. The present invention provides a solution for both drawbacks.

SUMMARY OF THE INVENTION

The invention provides a method for preparing food products by means of processing food particles with a gelling agent, comprising the processing steps of: a) providing food particles; b) providing a viscous gelling agent; c) treating the viscous gelling agent with an acidic buffer solution; and d) bringing at least a part of the food particles in contact with the viscous gelling agent. This method enables the manufacture of food products that are stable over time. Additionally, due to the acidic conditions of the buffer solution the viscous gelling agent is adhered to proteins present in the food particles via intermolecular hydrogen-bonding. The food products manufactured using the method according to the invention hereby have a good overall texture and in case of co-extrusion a well-constructed network structure of the coating layer and a good adhesion of the coating layer to the food dough.

The food particles as used in the method according to the present invention can be pieces of encapsulated vegetables, pieces of meat such as minced meat, meat portions, pieces of chicken fillet, pieces of fish fillet and the like or can be in the form of food dough. The food dough can be manufactured from animal or vegetable products. The food dough preferably comprises a combination of animal and vegetable products such as meat, fish, poultry, vegetable, soy protein, milk protein or proteins from chicken eggs.

The viscous gelling agent is suitable for extrusion of a coating layer. This preferably takes place by means of co-extrusion, however, the present invention also relates to the extrusion of a coating layer and wherein the coating layer is subsequently filled with food particles. Furthermore, the viscous gelling agent may be mixed with the food dough. The gelling agent preferably comprises polysaccharides, proteins or combinations thereof. Polysaccharides, which can be readily used in the present invention, are agar, gellan, carrageenan, alginates, cellulose, pectin, xanthan and locust bean gum or derivatives thereof. It is also possible to use a combination of these or other polysaccharides. It is also possible to use proteins in the gelling agent optionally in combination with polysaccharides. Proteins particularly suitable for this purpose are collagen, milk protein or derivatives thereof. It is however also possible to use combinations of collagen and milk protein. It is further also possible to make use of a gelling agent comprising proteins such as collagen as well as polysaccharides such as alginate.

The viscous gelling agent may be a coating layer at least partially enclosing the strand of food dough and/or the viscous gelling agent may be mixed with the strand of food dough. The resulting food product may be further coated with a coating material based on plastic at least partially enclosing the food product.

The acidic buffer solution as used in the method according to the present invention prevents ionic strengths differences between the food dough and the gelling agent. The acidic buffer solution has a pH in the range of about 3.0 and 6.0. Preferably the pH is in the range of about 3.1 and 4.5, more preferred the pH of the acidic buffer solution is in the range of about 3.2 and 4.0 and even more preferred the pH of the acidic buffer solution is in the range of about 3.3 and 3.6. Most preferably the pH of the acidic buffer solution is about 3.5. The term "about" as used herein is intended to include values, particularly within 10% of the stated values, even more preferred within 5% of the stated values.

The acidic buffer solution can be made of several suitable buffering agents. In an embodiment the total concentration of buffering agents present in the acidic buffer solution is in the range of about 50 and 500 mM, since a too low concentration of buffering agents will provide a weak, drifting buffer, while a too high concentration of buffering agents negatively affect the desired properties of the food product, such as taste. Preferably the concentration of buffering agents is in the range of about 100 and 400 mM. More preferably the concentration of buffering agents is about 100 mM, about 200 mM, about 300 mM or about 400 mM. Even more preferred the concentration of buffering agents is in the range of about 200 and 300 mM. Most preferred the acidic buffer solution comprises buffering agents present in a total concentration of about 250 mM providing a good balance between the taste of the food product and the strength of the buffer.

In a further embodiment of the present invention the buffering agents are selected from citrate and citric acid. Preferably citrate is added to the solution in the form of a salt, e.g. sodium citrate, calcium citrate or combinations thereof. Most preferably calcium citrate is used since calcium has a positive effect on the gelling agent strength. In case calcium citrate is used, additional strengthening steps may be avoided.

The acidic buffer solution described above may be used directly in a method for preparing food products according to the present invention or may be formulated into a gel or paste wherein the gel or paste comprises the acidic buffer solution of the present invention in combination with a thickener agent suitable for food products. Preferably the thickener agent is a polysaccharide, e.g. starch. The advantage of using a gel or paste comprising the acidic buffer solution of the present invention is that the acidic buffer is released when heating the food product. Due to the delayed release of acidic buffer adherence of the viscous gelling agent to the meat via intermolecular hydrogen-bonding is even further established during preparation, e.g. cooking, of the food product enhancing the properties of the food product even further.

In an embodiment of the present invention, the acidic buffer solution is mixed with the viscous gelling agent to form an acidified viscous gelling agent. It was further found that the viscous gelling agent may be divided into at least two fractions wherein at least one of the fractions is treated, e.g. mixed, with the acidic buffer solution. The acidified fraction of the viscous gelling agent may be rejoined with the untreated fraction prior to or during co-extrusion of the food product. Furthermore, it was found that the acidic buffer solution may be mixed with the viscous gelling agent either in one step or in successive steps to form an acidified viscous gelling agent.

The extrusion of the strand of food dough and a coating layer extending there around preferably takes place by means of co-extrusion. A device and method here for has already been described in U.S. Pat. No. 3,622,353. In a preferred embodiment of the extruder the strand of food dough leaves the extruder via a first outlet in the case of co-extrusion. Via a second outlet at least partially enclosing the first outlet the coating agent treated with an acidic buffer solution according to the invention is arranged on the strand of food dough such that a coating layer is formed.

It was found that it is sufficient to bring at least a part of the food particles in contact with the viscous gelling agent to produce food products that are stable over time. The stability of the produced food product according to the method of the present invention is determined by the availability of proteins present in the food particles. In other words, the acidified viscous gelling agent needs to be in contact with the proteins present in the food particles, i.e. non-fat parts of the food particles, to be able to form stable intermolecular hydrogen-bonding. Preferably, at least about 40% of the surface of the food particles that is in direct contact with the viscous gelling agent is covered by non-fat, protein-rich food particles.

In order to maintain the reciprocity of the quality of the produced food products according to the method of the present invention, the availability of protein-rich parts of the food particles at the surface that is brought into contact with the viscous gelling agent needs to be maintained. Due to smearing of the inner surface of the piping through which food particles are transported, the availability of protein-rich parts at the surface that is brought into contact with the viscous gelling agent may be reduced. The smearing of the piping may be prevented by different techniques. For example, the smearing may be prevented by heating of the tube to prevent formation of a layer of fat particles coating the inner surface of the piping. Alternatively, the surface of the piping may be polished, e.g. by electrolytic polishing, to prevent any adherence of food particles to the inner surface of the piping. Furthermore, the piping may be provided with a water fluid layer enclosed by the inner surface of the piping and the outer surface of the food particles transported through the piping. It is noted that by using a water fluid layer to prevent smearing of the piping, the water fluid layer formed onto the food particles is preferably removed before the viscous gelling agent is applied onto the surface of the food particles.

Additionally, once smearing of the piping is observed, the constant quality of the food products produced according to the method of the present invention may be maintained by subsequently reducing the smearing. For example, the smearing of the piping is made undo by performing sufficient washing steps of the piping. Preferably, in order to minimize the period wherein the method is interrupted due to washing of the piping, the to be washed piping is preferably exchanged with another clean piping.

In an embodiment of the present invention the formed strand of food particles may be roughened before the food particles are brought into contact with the viscous gelling agent in order to increase the surface of the food particles and to increase the adherence of the viscous gelling agent to the food particles.

In a preferred embodiment of the present invention the formed strand coated by and/or mixed with the gelling agent of the present invention is subsequently subjected to at least one strengthening step e) wherein the viscous gelling agent is treated with a liquid strengthening agent. The strand may be treated by spraying the liquid strengthening agent onto the food product or by passing the strand through a bath comprising the liquid strengthening agent. Preferably the liquid strengthening agent is added to the viscous gelling agent during or after the gelling agent is brought in contact with the meat particles. Most preferred the liquid strengthening agent is added to the viscous gelling agent after the gelling agent is brought in contact with the meat particles.

The liquid strengthening agent of the present invention may comprise salt solutions. More specific the salt solution may comprise sodium salt, potassium salt, calcium salt, magnesium salt and/or combinations thereof. Specific salts which could be used are, among others, sodium chloride, potassium chloride, dipotassium phosphate, calcium chloride, calcium lactate, calcium acetate or calcium phosphate. These salts are recommended because they are already much used in food products and because they have a positive effect on the strength and other properties of the coating layer. Calcium salts in particular such as calcium chloride, calcium lactate, calcium acetate, calcium phosphate or combinations thereof have a great effect on the strength of the gelling agent, particularly when the gelling agent comprises polysaccharides such as alginate. As already mentioned above, the strengthening agent has further positive effect on the adherence of the viscous gelling agent to the food particles.

In a further embodiment of the present invention the liquid strengthening agent of the present invention comprises a salt solution wherein the concentration of calcium salts is in the range of about 0.001 and 15% by weight, preferably in the range of about 0.01 and 10% by weight.

Particularly good properties are obtained when the liquid strengthening agent of the present invention comprises salt solution comprising salts of sodium or potassium in addition to calcium. The sodium salt or potassium salt concentration of the salt solutions is preferably at least about 0.01% by weight. More preferred the concentration of sodium salt or potassium salt is in the range of about 0.01 and 5.0% by weight. The concentration of sodium and/or potassium in the strengthening agent may substantially correspond with the concentration of sodium and/or potassium in the food dough. The transport of sodium and/or potassium ions from the gelling agent to the food dough, or vice versa, is in this way prevented from taking place.

It is possible to already add the liquid strengthening agent with calcium salts and optionally, sodium and/or potassium salts to the gelling agent prior to and during extrusion of the strand. It is advantageous here to make use of salts which are relatively poorly soluble in water, such as calcium carbonate, calcium citrate, calcium oxide, calcium phosphate, calcium silicate, calcium sulphate, calcium sulphide, calcium tartrate or mixtures thereof. An advantage hereof is that a longer shelf-life of the gelling agent is obtained due to the relatively slow release of calcium ions during storage of the manufactured food product, such as a sausage. In addition, the strengthening agent can also comprise (liquid) smoke, pyrolyzed sugars, cross-linkers and/or derivatives thereof.

In case of a non-moulding method, it is further recommended to divide the strand into separate parts after step e) of the above stated method. This can be performed with for instance a knife, which cuts through the strand at determined adjustable intervals. Separate strand parts, such as sausages, are thus obtained. The method of the present invention may further include the processing of food particles comprising the portioning of food products by use of shaping, e.g. rotational shaping or flat plate shaping. In contrast to the invention described in patent application WO 2009/145626 A1, it is not then necessary to divide the strand into separate units prior to the strengthening step. Higher production speeds can hereby be achieved, and a more uniform product is obtained. Emptying of the outer ends of the separate parts (sausages) is also prevented.

Due to the use of an acidic buffer solution the treated viscous gelling agent adheres to the meat in the food dough. In case the food strand formed in a co-extrusion method is divided into separated parts, the adherence between the viscous gelling agent of the present invention and the meat in the food dough provides a sausage of which the viscous gelling agent covers the outer ends completely.

Once the food strand comprising the treated viscous gelling agent has been formed according to above stated method, it is further recommended to perform an additional stabilizing step to improve the stability of the gelling agent even further. In yet another embodiment of the present invention the above stated method further comprising an optional stabilizing step f) wherein the food product is treated with an acidic stabilizing solution increasing the storability time of the food product of the above stated method from about 4 to 5 days to about 2 to 2.5 weeks.

The acidic stabilizing solution of the present invention may have a pH lower than about 3.0. Preferably the pH of the acidic stabilizing solution is in the range of about 2.0 and 2.5. A preferred acidic stabilizing solution comprises citric acid, sulfuric acid, hydrochloric acid or combinations thereof. Since a preferred viscous gelling agent used in the above stated method is sodium alginate, most preferred the acidic stabilizing solution comprises hydrochloric acid, due to the formation of sodium chloride. The strand may be treated by spraying the acidic stabilizing solution onto the food product or by passing the strand through a bath comprising the acidic stabilizing solution.

In another embodiment the processing steps a)-d) are subsequent processing steps. However, for the method of the present invention it is not needed that the strengthening step and the stabilizing step are performed in immediate succession. In immediate succession is here understood to mean that either the strengthening step and the stabilizing step are performed immediately one after the other or that one or more intermediate steps are performed between the strengthening step and the stabilizing step, but wherein the treatment time of the food particles in the combined intermediate steps amounts to a maximum of 300 seconds. Since the method including the strengthening step e) already provides a stable product which is storable for about 4 to 5 days, the final stabilizing step f) may be performed at a later stage.

Following co-extrusion of the strand of food dough with a coating layer thereon, i.e. after step d) of the claimed method, in another embodiment of the present invention the strand is divided into separate parts. This division into separate parts can take place using a knife as described above. After the strand has been divided into separate parts, these separate parts are subjected to at least one strengthening step and/or optional stabilizing step. In even a further preferred embodiment of the present invention the strand is divided into separate parts after further stabilizing the strand, i.e. after step f).

Therefore, the meat particles are formed in individual food products each assembled from food particles and gelling agent after step d), step e) and/or step f).

The treatment time of the strand in the strengthening step and optionally the stabilizing step is preferably in the range of about 1 and 600 seconds, preferably in the range of about 1 and 100 seconds, more preferably in the range of about 1 and 60 seconds, still more preferably in the range of about 1 and 40 seconds, most preferably in the range of about 1 and 20 seconds.

The temperature of the strengthening agent in the strengthening step preferably lies in the case of so-called cooked products in the range of about 25 and 95° C., preferably in the range of about 40 and 90° C., more preferably in the range of about 50 and 80° C., most preferably in the range of about 60 and 80° C. In the case of non-cooked products the temperature in the separate strengthening steps lies in the range of about −5 and 30° C., more preferably in the range of about −2 and 25° C., even more preferably in the range of about 0 and 20° C., most preferably in the range of about 5 and 15° C.

The above mentioned temperatures are also suitable temperatures of the acidic stabilizing solution in the stabilizing step.

In a preferred embodiment the method of the present invention comprises a viscous gelling agent selected from alginate, e.g. sodium alginate. Preferably the viscous gelling agent of the present invention comprises in the range of about 1.0 and 8.0% by weight alginate. In addition to alginate, the coating agent may also comprise hydrocolloids and proteins such as collagen or milk protein.

A relatively uniform coagulation of the proteins used in the gelling agent can for instance take place by making use of enzymes. Preferred enzymes are selected from transglutaminase, lactase, bilirubin oxidase, ascorbic acid oxidase and ceruloplasmin.

Reference is also made in this respect to U.S. Pat. No. 6,121,013, which is wholly incorporated here by way of reference.

Liquid smoke or derivatives thereof are particularly recommended as cross-linkers. An advantage of using these agents is that not only do they contribute toward controlling the structure of the coating layer of co-extruded food products, they also contribute toward the physical properties of extruded food products, e.g. taste.

As a consequence, in a further embodiment of the present invention the liquid strengthening agent in the strengthening step e) and/or the acidic stabilizing solution in the stabilizing step f) may further comprise an enzymatic solution and/or a cross-linker.

In a specific version of the method according the present invention during processing step d) the treated viscous gelling agent is at least partially enclosing the strand of food dough. The advantage of the above-described version of method is that the casing is sticking to the food dough during portioning of the resulting food strand, due to crimping of casing material comprising the treated viscous gelling agent. As a result, better ended, e.g. non open-ended, strand portions, e.g. non open-ended sausages, are produced by the method of the present invention.

In yet another alternative version of the method according the present invention, the food products are prepared by means of extrusion whereby the viscous gelling agent is at least partially mixed with the strand of food dough. The method may also include the processing of food particles comprising the assembling of food particles. Even so the assembling of food particles may be bound to each other by the treated viscous gelling agent before or during processing step d). Also the food particles may be injected with the treated viscous gelling agent.

In yet another alternative version of the method according the present invention at least one electric property of the food particles and/or the viscous gelling agent is measured. Preferably the electric property is selected from ionic strength, conductivity and electrokinetic potential differences. The electric property may be measured by an intelligent control unit, e.g. a computer running suitable software, and the results are subsequently used for automated adaptation of the addition properties of the acidic buffer solution used during processing step c). The term "addition properties" as used herein is intended to include changes in volume of the buffer added to the viscous gelling agent and/or changes in concentration of the buffering agents present in the acidic buffer solution.

In a further alternative of the method according the present invention the mechanical strength of the food particles and/or the viscous gelling agent may be measured. In more detail the mechanical strength may be measured by an intelligent control unit, e.g. a computer running suitable software, and the results are subsequently used for automated adaptation of the addition properties of the acidic buffer solution used during processing step c).

Furthermore, the food particles used in the method of the present invention may be brought in contact with the viscous gelling agent during processing step d) in multiple stages. For example, the food particles may be brought in contact with the viscous gelling agent in two or more subsequent steps by using one or more gelling agent baths and/or one or more steps of spraying of the viscous gelling agent onto the food particles.

Additionally the method according the present invention may further also comprise a brining step wherein the exterior of the food product is treated with an aqueous salt solution. The aqueous salt solution may be sprayed onto the food product and/or the aqueous salt solution is applied onto the food product by using a bath comprising the brining solution.

The present invention also relates to a kit-of-parts for use in the method of the present invention comprising at least one viscous gelling agent, and/or at least one buffering agent, wherein the agents are in the form of a powder. The kit-of-parts of the present invention has an enhanced stability and storability before being used in the method of the present invention. Preferably, the kit-of-parts of the present invention may further comprise at least one additional agent including a thickener agent and/or a liquid strengthening agent.

Alternatively, the kit-of-parts comprising the above identified different agents in a ready-for-use form, i.e. at least one viscous gelling agent in the form of a gel and/or at least one buffering agent and/or at least one liquid strengthening agent in the form of a solution. The kit-of-part of the present invention provides a ready-to-use solution for use in the method of the present invention.

The present invention also relates to a brining method for at least partially dehydrating the casing of a food product, comprising the processing steps of: x) providing a food product at least partially coated with a viscous gelling agent; y) providing electrodes; and z) electrifying the food product. The expression "electrifying" as used herein is intended to include a method of conducting an electric current through or applying an electric potential across the food product and/or the brining bath. To speed up the brining time the electric current may be conducted through or the electric potential may be applied across the brining bath as described in the method in previous paragraphs.

Electric brining, e.g. DC brining, causes shrinkage of casing gel material applied to food products. In particular casing gel material comprising alginate are preferred in DC brining. The electrically induced shrinkage of casing gel material causes its texture to strengthen. Therefore, instead of using an aqueous salt solution sprayed onto the food product and/or applying the aqueous salt solution onto the food product by using a bath comprising the brining solution, in addition or as a single treatment at least one pair of electrodes may be used to conduct an electric current through/applying an electric potential across the casing and food dough interface.

In a specific embodiment of the brining method according the invention the food product is partially coated with the viscous gelling agent and is interposed between a pair of electrodes and subsequently a DC current is applied. The DC current may have a field intensity within the range of about 25 to about 50 V/cm. More specific the DC current may have a field intensity within the range of about 30 to about 45 V/cm. Even more specific the DC current may have a field intensity within the range of about 35 to about 40 V/cm, or within the range of about 25 to about 35 V/cm, about 30 to about 40 V/cm, about 35 to about 45 V/cm or about 40 to about 50 V/cm.

Preferably in DC brining the formation of gas is avoided. Such DC brining can be achieved by using polypyrrole electrodes further comprising a complex microgel of polymethacrylic acid and calcium ions.

In order to reduce the weight loss of the gelling material during the electrolysis a cross-linking agent selected from the group consisting of barium, calcium, iron ions or combinations thereof may be used. In case the gelling material comprises alginate barium is a preferred option.

The shape of the affected area of the shrunken gelling material resembles the shape of the electrode. In a specific alternative the electrodes used in the DC brining method further comprises pores of different dimensions along the lines of the electrodes.

In a preferred embodiment the method of the present invention further comprises an electric brining step optionally in combination with a brining step wherein the exterior of the food product is treated with an aqueous salt solution.

The present invention also provides a device for preparing food products by means of processing food particles with a gelling agent according to the above described method. In a specific embodiment of the device according the present invention the device comprises measurement means for automated measuring electric properties and/or mechanical strength of the food particles and/or the viscous gelling agent. The ionic strength differences of the food dough and the viscous gelling agent measured by the measurement means may be analysed by an intelligent control unit, e.g. a computer running suitable software. To reduce the ionic strength differences of the food dough and the viscous gelling agent and to improve the stability of the viscous gelling agent, the ionic strength of the acidic buffer solution may subsequently be automatically adjusted by the intelligent control unit and the viscous gelling agent is subsequently treated with the automatically adjusted acidic buffer solution.

In a further alternative embodiment of the device according the present invention, the device also comprises an intelligent control unit for automatic adjustment of the ionic strength of the acidic buffer solution. This provides the opportunity, in case the difference in ionic strength of the food dough and the viscous gelling agent changes during the extrusion process, to adjust the ionic strength of the acidic buffer solution accordingly to prevent ionic differences to occur within the extrusion process.

The acidic buffer solution may be added to the viscous gelling agent before or during the forming of a casing, or alternatively or in combination, be mixed with the food particles. Furthermore, in case of co-extrusion the acidic buffer solution may be added onto the outer layer of the food dough formed by the food particles and wherein the coated food dough is subsequently co-extruded with the viscous gelling agent to form a food strand. The food strand comprising a core of food dough and two coating layers wherein the first layer comprises the acidic buffer solution and the outer layer comprises the viscous gelling agent. In a preferred embodiment the food dough is co-extruded with the acidic buffer solution, optionally in the form of a gel or paste, and the viscous gelling agent simultaneously to form a multi-layered food product.

The acidic buffer solution of the present invention can be added to the viscous gelling agent without mixing both components. Preferably, the acidic buffer solution and the viscous gelling agent are mixed together, before mixing the treated gelling agent with the food particles and/or co-extruding the treated gelling agent with the food dough formed by the food particles to form a food strand. Therefore, the present invention further provides a mixer for mixing the acidic buffer solution and the viscous gelling agent.

In an embodiment of the present invention the mixer is a static mixer suitable for increasing the turbulence of the viscous gelling agent and the acidic buffer solution fed through the mixer. Preferably the mixer is adapted to cause a turbulent flow having a Re (Reynolds number) of at least 2300. The mixer may comprise obstructions located in the flow path of the gelling agent and the buffer solution. The flow path may be contained in a tube, e.g. a tube with a circular or squared cross section. The mixer further comprises at least one inlet for providing the viscous gelling agent and/or acidic buffer solution and at least one outlet outflow of the mixed material. The outlet may be connected to a production device wherein the gelling agent/buffer solution mixture is to contact the food products so to form a casing. The dimensions of the mixer may vary dependent on the production specifications. In a specific embodiment the mixer may have a length of 0.2-1.0 m and a cross section of 0.5-10 cm (e.g. an cross section of approximately an inch.

As the mixer is used in the preparation of food products, regular cleaning of the device is necessary in order to ensure high quality food production. Therefore, the housing, the obstructions and/or a part of the mixer may be designed to take apart in order to enable efficient end effective cleaning. The housing and/or mixing means may comprise fixing means for detachably fixing the housing around the flow path/obstructions. In an embodiment mixing cavities are formed by mixing means and the housing attached to or place around the mixing means. In a preferred embodiment, the mixing means are provided with fixing means to detachably attach the housing onto the mixing means.

The mixer of the present invention may also comprise obstructions, which are removable from a housing in order to clean the housing and/or to clean the mixing means separately. Such removable obstructions may also be replaceable by other obstructions e.g. with other mixing qualities. The obstructions of the mixer be selected from various types of elements For instance use can be made of panels, e.g. hooked panels having angular surfaces. The obstructions may also be arranged so that a maze or labyrinth is formed enabling to realise a homogenous mixture of the viscous gelling agent and the acidic buffer solution with a relative short mixing path. In an embodiment the obstructions are connected to the inner surface of the housing, extending to the central axis of the housing. In even another embodiment, the obstructions are contained in a removable inner housing wherein the inner housing is placed into an outer mixer housing. The inner housing may be removed, together with the obstructions, during cleaning of the mixer and may be replaced instantly by placing a clean or new inner housing and obstructions, into the housing of the mixer to reduce the cleaning time of the mixer. The obstructions and/or the inner housing holding the obstructions may be made out of plastic or a metal suited for use in the manufacturing of food products.

In an embodiment of the present invention, the device comprises a first inlet for providing viscous gelling agent, which first inlet is connectable with a source of viscous gelling agent; a second inlet for providing acidic buffer solution, which second inlet is connectable with a source of acidic buffer solution; a third inlet for food particles, which third inlet is connectable with a source of food particles; a mixer; and an extrusion head. The mixer comprises a first inlet connected to the first inlet as defined above and a second inlet connected to the second inlet as defined above. The mixer further comprises at least one outlet for a mixture of acidic buffer solution and viscous gelling agent. The extrusion head comprises a first inlet connected to the third inlet for food particles and a second inlet connected to the above-defined outlet of the mixer.

It was found that the mixer of the device is preferably a dynamic mixer in order to provide a stable emulsion of viscous gelling agent and acidic buffer solution. A dynamic mixer is further preferred in case food particles are incorporated in the mixture of viscous gelling agent and acidic buffer solution.

The device of the present invention may further comprise a first dosing pump, e.g. a lobe pump, situated between the mixer and the extrusion head to ensure optimised proportions of the food dough and the mixture of viscous gelling agent and acidic buffer extruded by the extrusion head. Moreover, a further second mixer may be situated between the first dosing pump and the extrusion head to optimize the mixture of viscous gelling agent and acidic buffer solution. In a preferred embodiment, the second mixer may be a static mixer as already described above.

During co-extrusion, the distribution of the constituents between the centre of the extruded food dough and its periphery is further promoted by arranging a grinder between the third inlet for food particles and the first inlet of the extrusion head. Moreover, to regulate, or dose, the amount of gelling agent and acidic buffer solution, a second dosing pump situated upstream from the first mixer may be used. Preferably, the second dosing pump is a corkscrew pump.

The present invention also provides a food product obtainable with the method according the present invention. In a specific embodiment, the food product relates to an at least partially coated food strand. The food product may be in the form of sausages, injected products, assembled food products, portioned food products, meat and fish.

The present invention furthermore provides the use of a buffer solution for stabilizing a viscous gelling agent. The buffer solution specifically may have a pH of about 3.0 to 6.0, preferably about 3.1 to 4.5, more specific about 3.2 to 4.0, even more specific about 3.3 to 3.6, most specific about 3.5.

The present invention furthermore also provides a method of preparing a gelling agent for food products wherein the method comprising the processing steps of:
i) providing a viscous gelling agent; and
ii) treating the viscous gelling agent with an acidic buffer solution.

The invention finally also provides a casing obtained by the method according the present invention. A casing prepared by the method of the present invention has improved strength properties compared to a similar casing material comprising the same viscous gelling agent that is not treated with an acidic buffer solution.

BRIEF DESCRIPTION OF THE DRAWINGS

The present invention will be further elucidated on the basis of the non-limitative exemplary embodiment shown in the following figure. Herein shows.

DETAILED DESCRIPTION OF THE PREFERRED EMBODIMENTS

Figure 1:
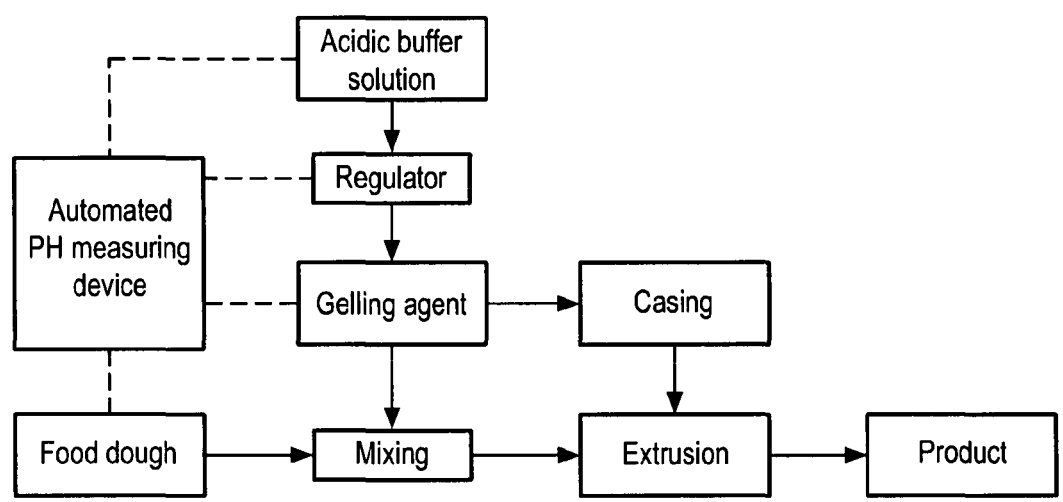
FIG. 1 a flowchart schematically describing the method of the present invention, FIG. 2 a mixer of the present invention, FIG. 3 a block diagram of the method performed by the device of the present invention, FIGS. 4 to 6 a device of the present invention, and FIGS. 7 to 9 graphs representing the differences in strength using various casing gel materials.

FIG. 1 shows a flowchart schematically describing the method of the present invention. In this schematic overview gelling agent is treated with acidic buffer solution. The regulator that is connected to the automated pH-measuring device regulates the amount of acidic buffer solution added to the gelling agent. The automated pH-measuring device is subsequently connected to the acidic buffer solution, gelling agent and food dough. Based on the ionic strength differences between the gelling agent and the food dough, the amount of acidic buffer solution added to the gelling agent is adjusted automatically by the automated pH-measuring device. The gelling agent and the acidic buffer solution is preferably mixed in a mixer to produce a homogenous mixture of acidic buffer solution and the gelling agent (not shown in the flowchart). The treated gelling agent is mixed with the food dough directly and extruded to form a food strand and/or the treated gelling agent is formed into a casing and co-extruded with the food dough to form a food strand at least partially coated with the gelling agent.

Figure 2:
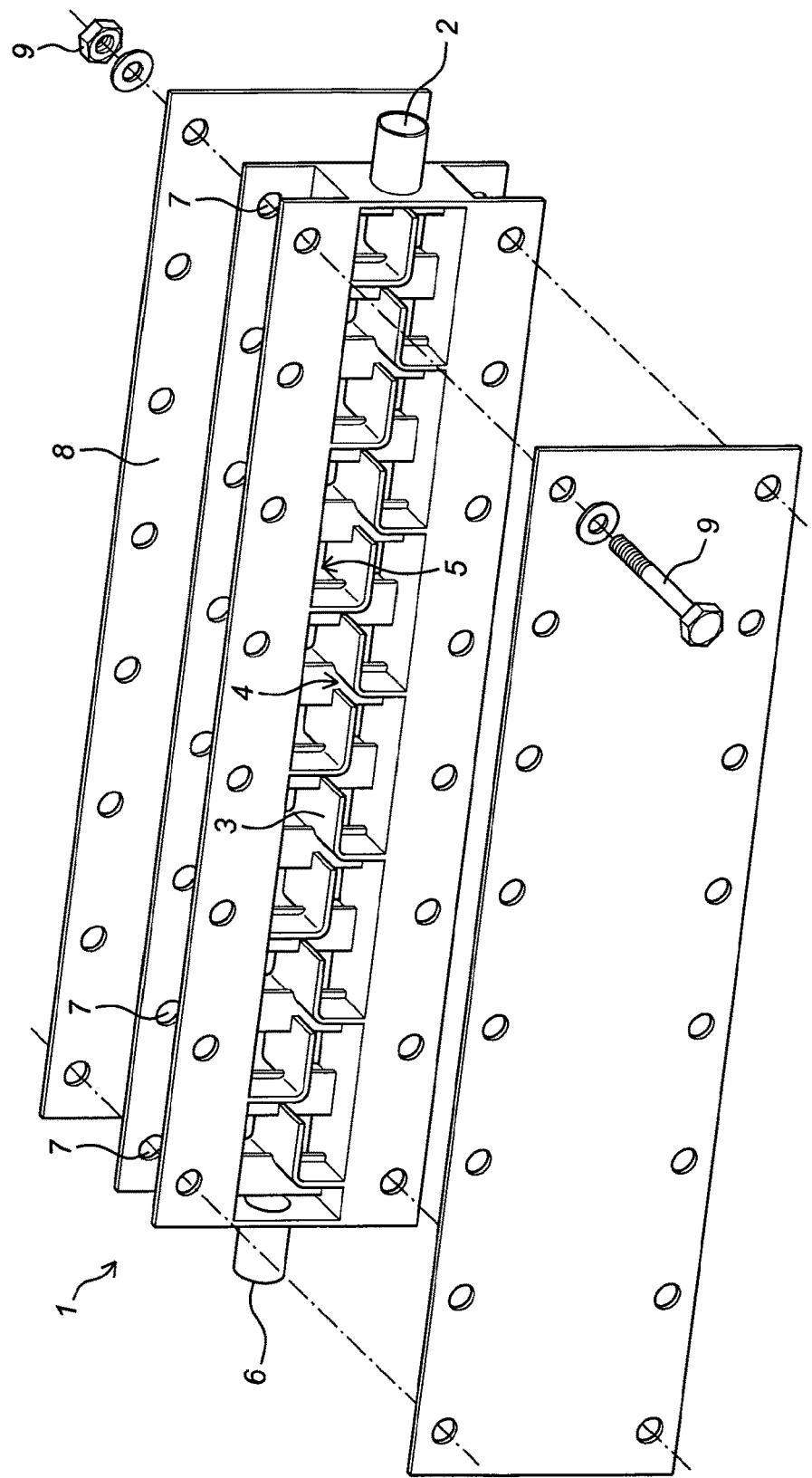

FIG. 2 shows a mixer 1 for mixing the gelling agent and the acidic buffer solution to form a homogenous mixture of acidic buffer solution and the viscous gelling agent. The mixer 1 is a static mixer and therefore, only stationary elements are causing the turbulence of the components to be mixed. The mixer 1 comprises an inlet 2 for feeding the gelling agent and the acidic buffer solution. It is also possible to have two separate inlets feeding the gelling agent and the acidic buffer solution separately to the mixer. The inlet 2 is connected to containers (not shown here) comprising the gelling agent and the acidic buffer solution. Furthermore, a balance and/or dosing means connected to a computer (not shown here) may be placed between the supply of gelling agent and acidic buffer solution and the mixer 1 in order to control the amount of viscous gelling agent and/or acidic buffer solution to be mixed in the mixer 1. The mixer 1 as shown comprises panels 3 arranged so to form a labyrinth having gaps 4 and openings 5 causing the components to be mixed to turbulently flow through the mixer. The panels 3 may be arranged having an angel in relation to a centre line of the mixer that differs from 90°. The mixer further comprising an outlet 6 for removal of the mixed gelling agent/acidic buffer from the mixer 1. The outlet 6 is connected to a processing station wherein the mixed gelling agent/acidic buffer is able to contact food products e.g. to form a casing around the food products (not shown here). The mixer 1 may also comprise fixings 7 for fixing a housing 8 to the obstructions. The housing 8 may be fixed by using bolts and/or screws 9. The housing 8 may also be provided with plural separate plates fixed to the mixer 1, e.g. on opposite sites. By removing the housing 8 the mixer 1 is easier to clean.

Figure 3:
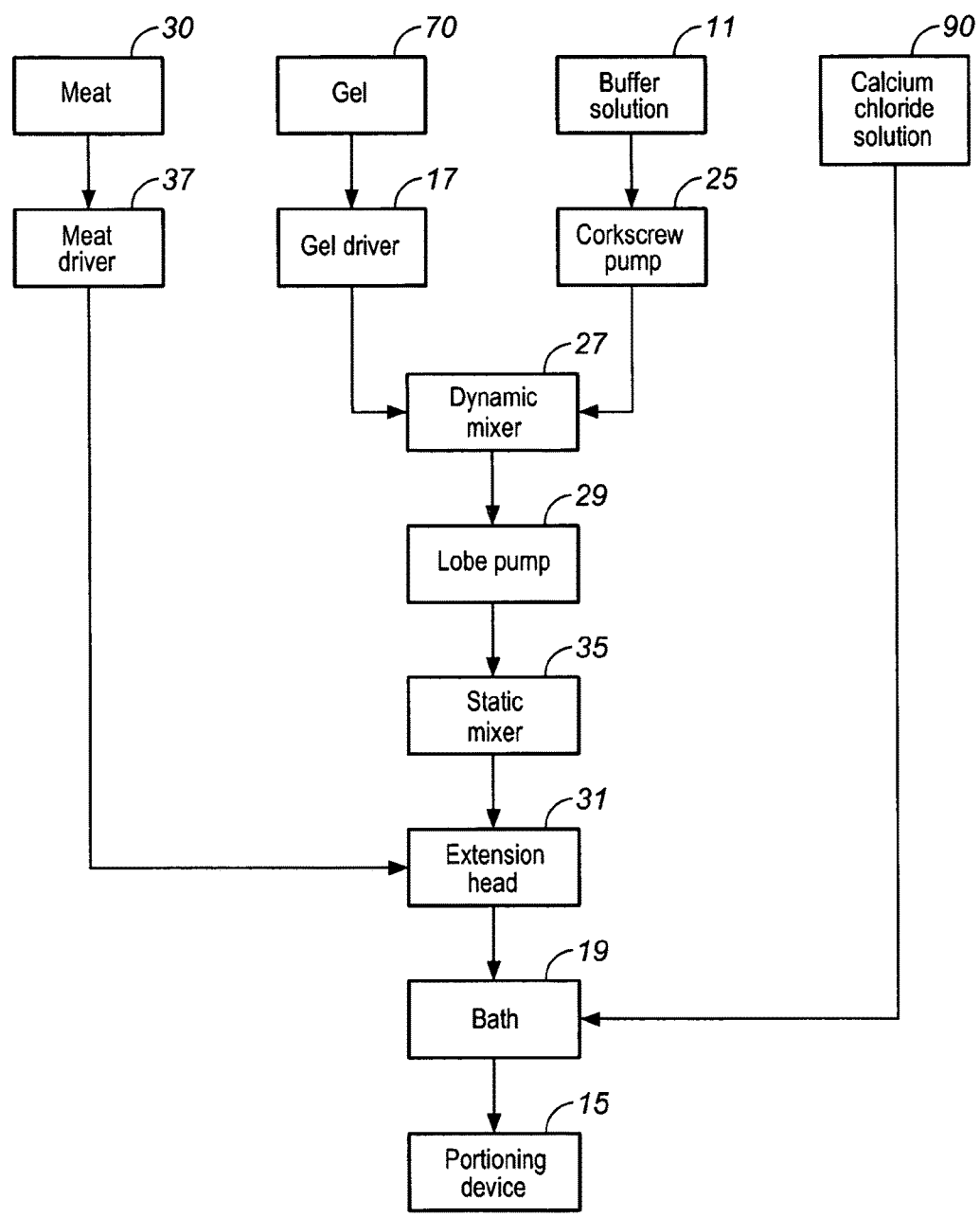
Figure 4:
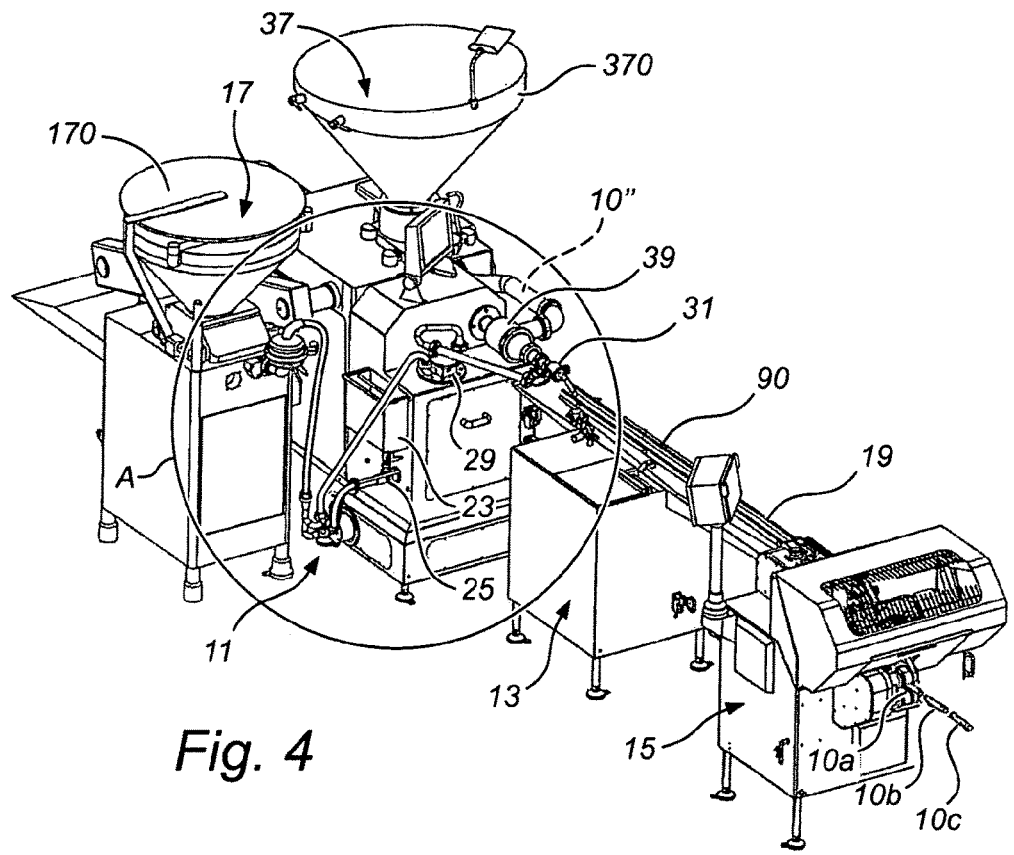
Figure 5:
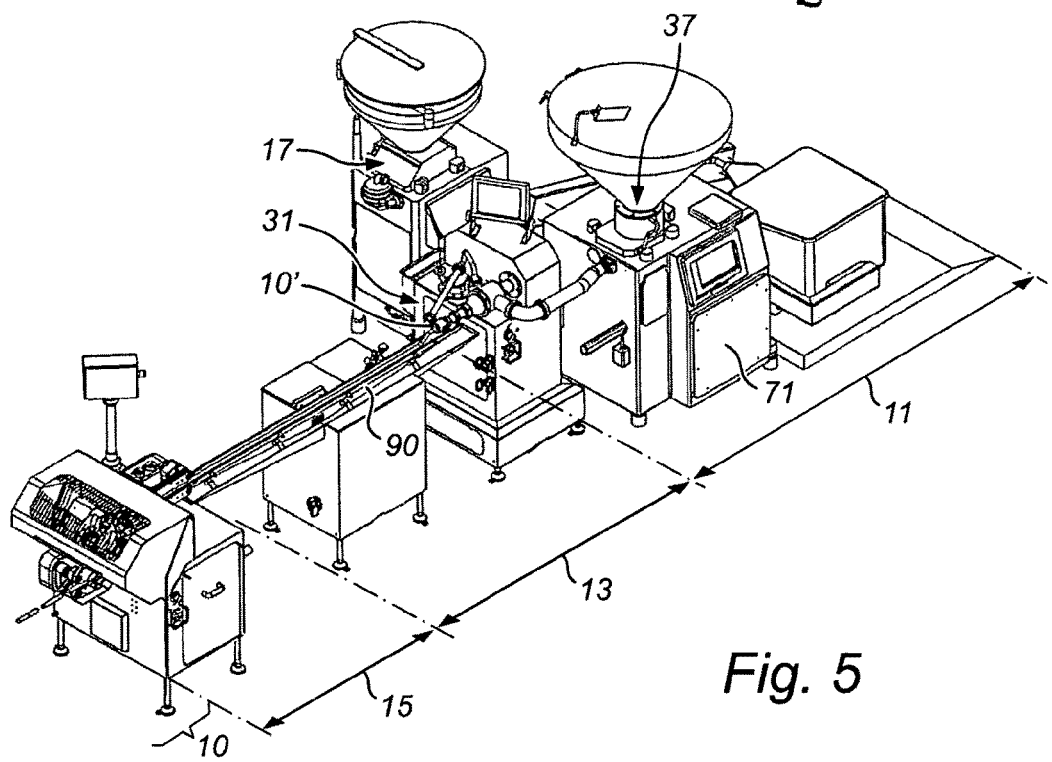
Figure 6:
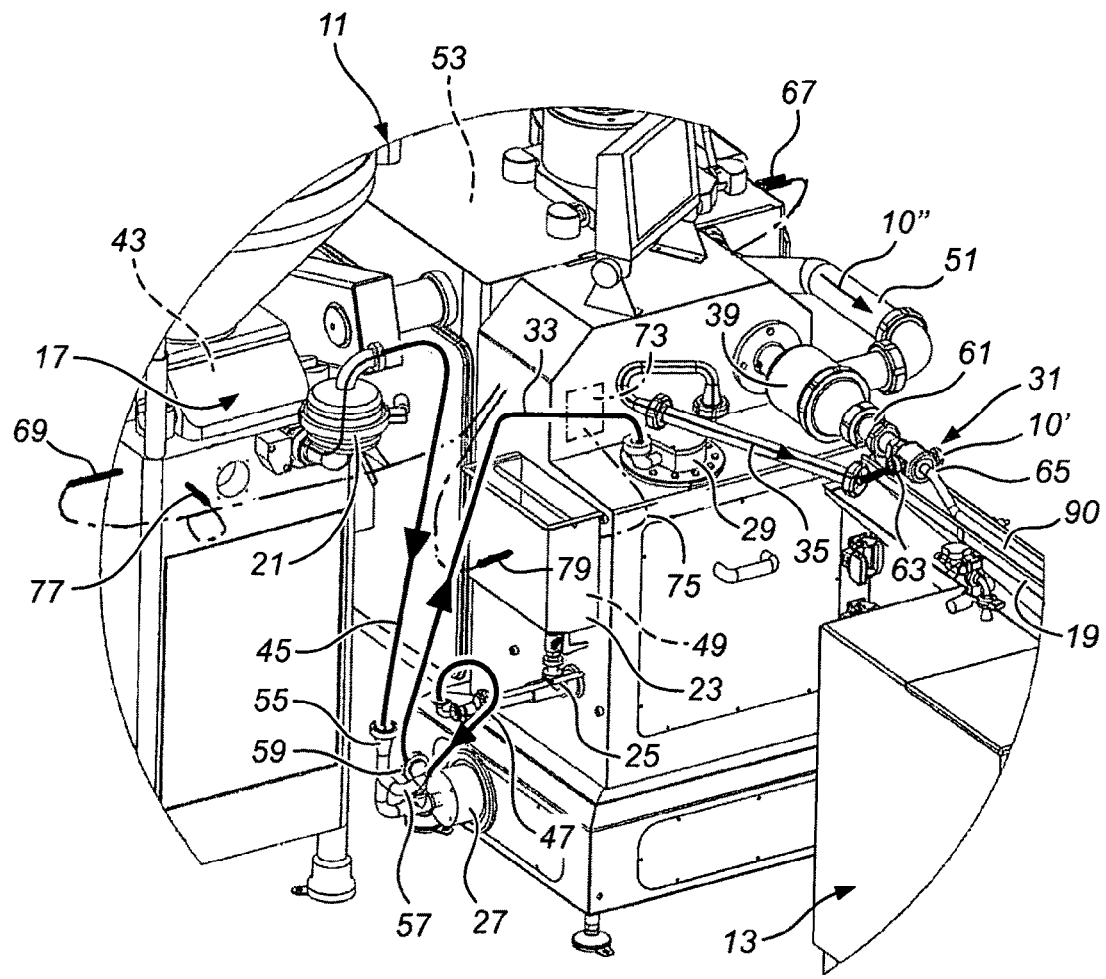

FIG. 3 shows a block diagram of the production method provided by the device as disclosed in FIGS. 4 to 6. As it can be derived from the schematic overview of FIG. 3 a gel driver 17 and a corkscrew pump 25 provide respectively a viscous gelling agent 70 and an acidic buffer solution 11 to a dynamic mixer 27. The gel 70 may preferably comprise alginate. Alginate consist of two types of monomers: glucuronate (G-residue) and mannuronate (M-residue). The monomers can appear in homopolymeric blocks of consecutive G-residues (G-blocks), consecutive M-residues (M-blocks) or alternating M and G-residues (MG-blocks). By varying the presence of the homopolymeric blocks, the product characteristics of the alginate, e.g. viscosity, pH, Brix degree, particle size, texture and microbiology, may be adjusted. The acidic buffer solution 11 may comprise citric acid monohydrate and sodium citrate. Both constituents are provided in powder form. To form the acidic buffer solution 11, both constituents are dissolved in water. After mixing both components, the mixture is dosed to an extrusion head 31 by using a lobe pump 29. In order to increase the homogeneity of the mixture produced a static mixer 35 may be used. Additionally, a meat driver 37 provides meat 30 to the extrusion head 31. The meat 30 may comprise beef, pork, mutton, poultry, lamb and the like and combinations thereof. The meat 30 may further comprise various preservatives and/or antioxidants. The meat 30 may even further comprise acidic buffer solution and/or viscous gelling agent.

The meat 30 is co-extruded together with the mixture of viscous gelling agent 70 and acidic buffer solution 11. The extruded product is transported through a coagulation bath 19, i.e. strengthening bath. The coagulation bath 19 is provided with a calcium chloride solution 90 enabling the strengthening of the viscous gelling agent 70. The concentration of the calcium chloride solution 90 is measured on a regular basis during the production of food products, since a decrease in calcium concentration would weaken the strength of the casing comprising viscous gelling agent 70 formed. Finally, the formed strand of food products is divided into individual food products by a portioning device 15.

FIGS. 4 to 6 show a device 13 for bringing the food product 10' in contact with a coagulation product 90 by transporting food product 10' through coagulation bath 19. In order to form the food product 10', alginate-based gel 70 is provided to a driver 17 via hopper 170. The driver 17 is further provided with a filter 21 (around 150-250 micron) to expel any air bubbles and large alginate particles from the alginate-based gel 70. The liquid acidic buffer solution 11, stored in adjacent tank 23, is actuated using a dosing pump 25 dosing or regulating the proportion between the gel 70 and the liquid acidic buffer solution 11. Preferably, the ratio between the viscous gelling agent 70 and the liquid acidic buffer solution 11 is about 90:10. The dosing pump 25 may be a corkscrew pump. Both viscous gelling agent 70 and liquid acidic buffer solution 11 are mixed by using mixer 27. To obtain a homogenous gel, mixer 27 is preferably a dynamic mixer. The formed mixture of viscous gelling agent 70 and acidic buffer solution 11 is dosed by dosing pump 29 to the extrusion head 31. Dosing pump 29 is designed such that pump 29 is able to regulate the amount mixture provided via the extrusion head 31 onto food product 10", i.e. food particles or food dough. Before the mixture of viscous gelling agent 70 and acidic buffer solution 11 is co-extruded with the food product 10", the mixture is provided via conduit 33 and dosing pump 29, e.g. a lobe pump, to static mixer 35 to increase the homogeneity of the mixture even further. The mixture of viscous gelling agent 70 and acidic buffer solution 11 is co-extruded with food product 10" by extrusion head 31 to form food product 10'.

The food product 10" is provided to driver 37 via hopper 370. The food product 10" is conveyed to the grinder 39. The grinder 39 preferably comprises a pre-cutting screen, cutters and a grinder screen having a variable diameter. The meat 30, i.e. food product 10" is provided to the extrusion head 31 and at least partially enclosed by the mixture of viscous gelling agent 70 and acidic buffer solution 11 to form food product 10'. The extrusion head 31 preferably comprises an expansion tube to orient the fibres of the meat 30 vertically in order to limit the reduction in length of the food product 10 after cooking. It is noted that the meat 30, i.e. food product 10", and the mixture of viscous gelling agent 70 and acidic buffer solution 11 are in close contact in the extrusion head 31.

After co-extruding the food product 10', the food product 10' is brought into contact with the calcium chloride solution 90 to form food product 10. Preferably, the food product 10' extruded from extrusion head 31 is immersed in the calcium chloride solution 90 for a few seconds. Device 13 comprising bath 19 thus places the food product 10' from apparatus 11 in contact with the coagulation solution 90. Device 13 is further provided with an outlet which may be connected to a portioning device 15 where the formed food product 10 is divided into individual food products 10a, 10b, 10c.

It should further be noted that apparatus 11 preferably comprises measuring means 67, 69 for automatically measuring the electric properties and/or the mechanical resistance of the food particles 30, 10'' and/or the viscous gelling agent 70. Preferably an intelligent control unit 71, e.g. a computer running suitable software, may be used. Furthermore, an intelligent control unit 73 may be used for automatically adjusting the ionic strength of the acidic buffer solution 11. The intelligent control unit 73 may be connected via line 75 to tank 23 used to store the acidic buffer solution 11. Additionally, measuring means 77, 79 may be used for automatically measuring the viscosity of the viscous gelling agent 70 and/or the acidic buffer solution 11.

The present invention will now be further illustrated using the non-limitative examples below.

EXAMPLES

Example 1

A 250 mM, pH 3.5 buffer solution was prepared containing 38.93 g/kg citric acid and 19.03 g/kg sodium citrate and 892.04 g water. This mixture was mixed with a high speed blender until both citric acid and sodium citrate was dissolved. 50 g/kg of Sodium alginate was added to the well mixed solution of water, citric acid and sodium citrate. This mixture was mixed for about 5 minutes to hydrate the sodium alginate. After mixing the created gel is vacuumed to extract the enclosed air as much as possible, to improve extrudability. The produced gel was subsequently co-extruded with food dough to produce coated food strand.

Example 2

A 250 mM, pH 3.5 buffer solution was prepared containing 38.93 g/kg citric acid and 19.03 g/kg sodium citrate and 877.04 g water. This mixture was mixed with a high speed blender until both citric acid and sodium citrate was dissolved. 50 g/kg Collagen fibers are added and mixed until the collagen fibers were completely swelled. 15 g/kg of Sodium alginate was added to the well mixed solution of water, citric acid, sodium citrate and collagen fibers. This mixture was mixed for about 5 minutes to hydrate the sodium alginate. After mixing the created gel is vacuumed to extract the enclosed air as much as possible, to improve extrudability. The produced gel was subsequently co-extruded with food dough to produce coated food strand.

Figure 7:
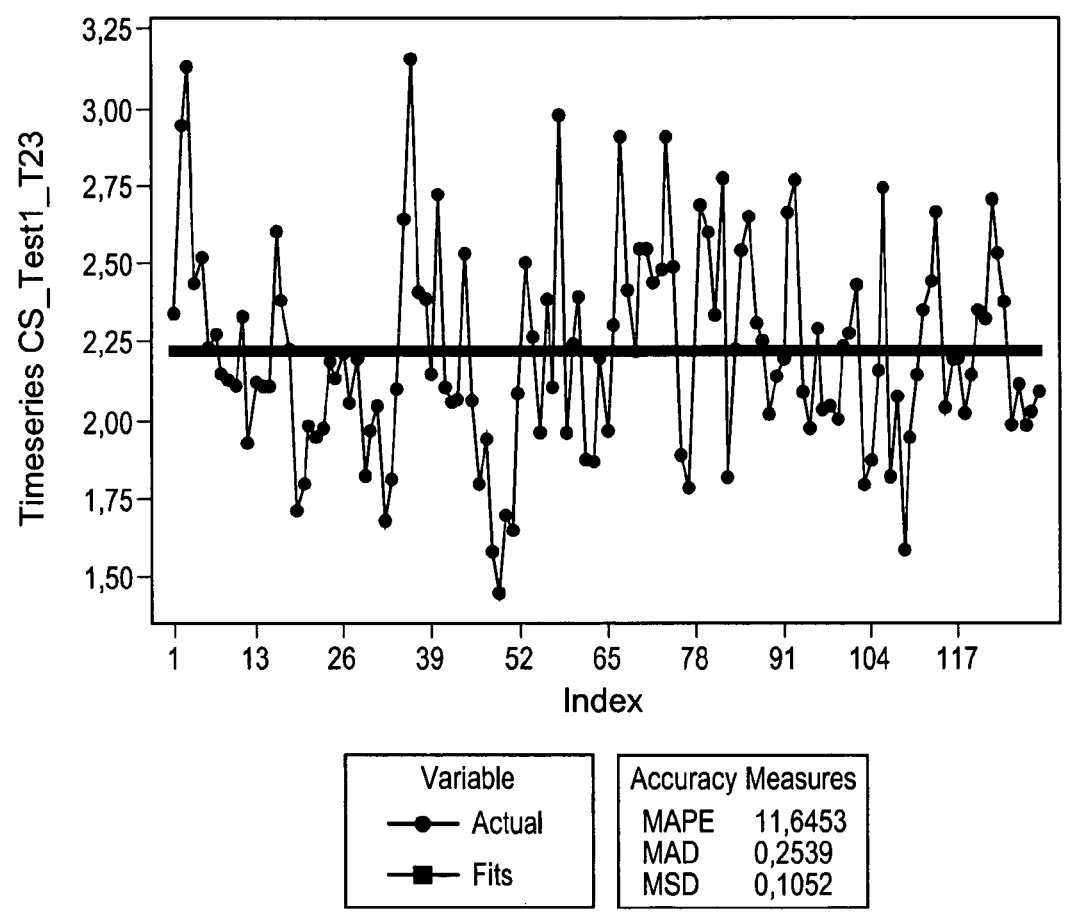
Figure 8:
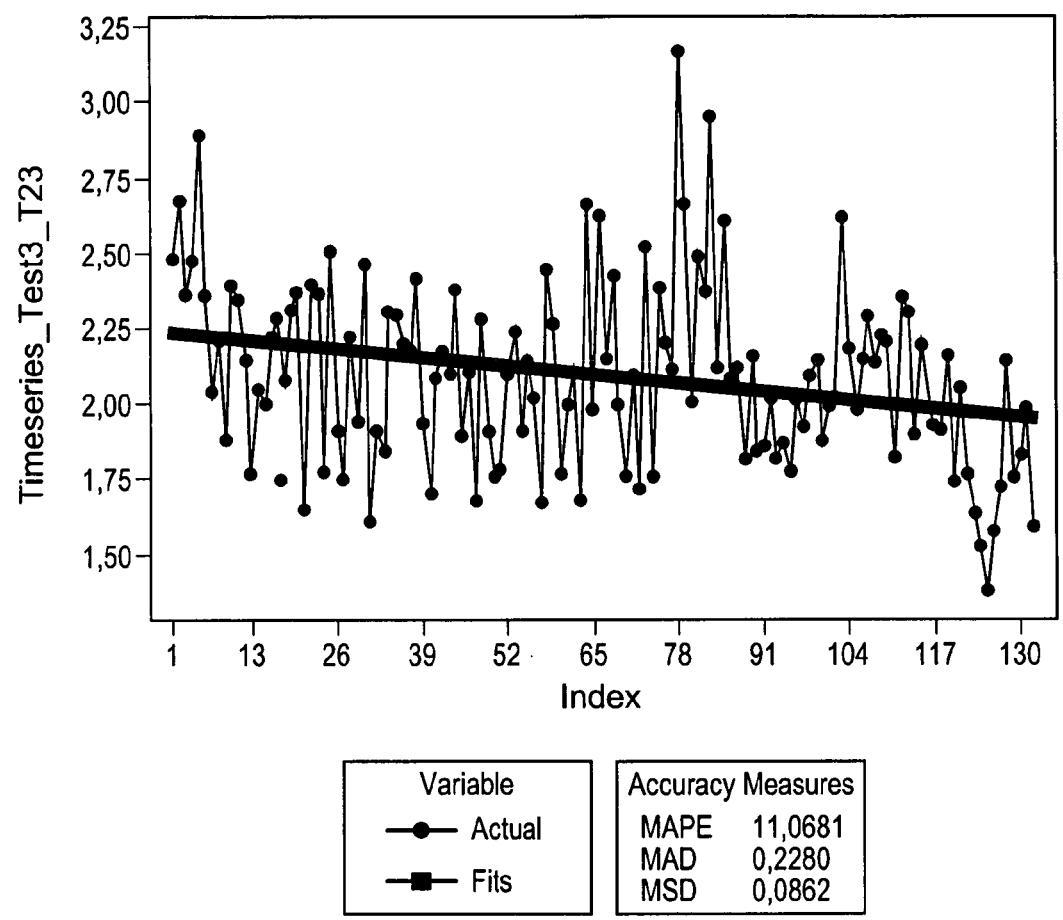
Figure 9:
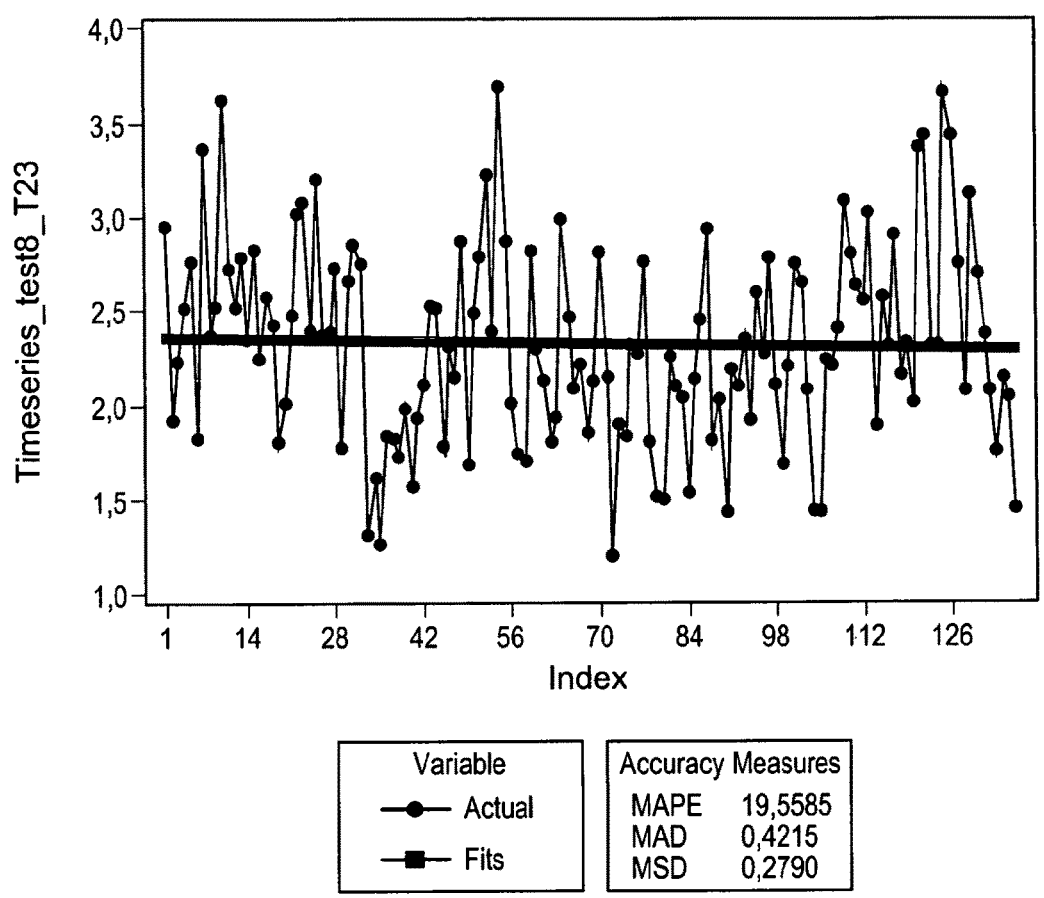

FIGS. 7 to 9 illustrate the differences in strength using casing gel material without treated with the acidic buffer solution of the present invention comprising mead dough free of phosphate (FIG. 7) and comprising meat dough comprising 0.5% phosphate (FIG. 8) compared to casing gel material according to the present invention (FIG. 9).

The method of the present invention results in a stronger food product which is more stable over time compared to food products comprising a prior art casing method.

What is claimed:
1. Method for preparing food products by means of processing food particles with a gelling agent, comprising the processing steps of:
    a) providing food particles;
    b) providing a viscous gelling agent;
    c) treating the viscous gelling agent with an acidic buffer solution, wherein the acidic buffer prevents ionic strength differences between the viscous gelling agent and the food particles; and
    d) bringing at least a part of the food particles in contact with the viscous gelling agent, wherein the viscous gelling agent comprises at least one selected from the group consisting of a protein and a polysaccharide.
2. Method as claimed in claim 1, wherein the protein is selected from the group consisting of collagen, milk protein, and combinations thereof.
3. Method as claimed in claim 1, wherein the acidic buffer solution has a pH of about 3.0 to 6.0.
4. Method as claimed in claim 1, wherein the acidic buffer solution has a total concentration buffering agents of about 50 to 500 mM.
5. Method as claimed in claim 4, wherein the buffering agents is selected from the group consisting of citric acid, sodium citrate, and/or calcium citrate.
6. Method as claimed in claim 1, wherein the acidic buffer solution is formulated into a gel comprising a thickener agent.
7. Method as claimed in claim 1, wherein the method further comprising a strengthening step e) wherein the viscous gelling agent is treated with a liquid strengthening agent.
8. Method as claimed in claim 7, wherein the liquid strengthening agent is added to the viscous gelling agent during the gelling agent is brought in contact with the food particles.
9. Method as claimed in claim 7, wherein the liquid strengthening agent comprises salt solutions selected from the group consisting of sodium salt, potassium salt, calcium salt, magnesium salt, and combinations thereof.
10. Method as claimed in claim 7, wherein the liquid strengthening agent comprises calcium salt in a concentration of about 0.001 to 15% by weight.
11. Method as claimed in claim 7, wherein the liquid strengthening agent is at least one selected from the group consisting of salts of sodium and the salts of potassium.
12. Method as claimed in claim 11, wherein the concentration of sodium substantially corresponds with the concentration of sodium in the food particles.
13. Method as claimed in claim 1, wherein the method further comprising a stabilizing step f) wherein the food product is treated with an acidic stabilizing solution.
14. Method as claimed in claim 13, wherein the acidic stabilizing solution having a pH lower than about 3.0.
15. Method as claimed in claim 13, wherein the acidic stabilizing solution is at least one selected from the group consisting of citric acid, sulfuric acid, hydrochloric acid, and combinations thereof.
16. Method as claimed in claim 1, wherein the meat particles are formed in individual food products each assembled from food particles and gelling agent after step d).
17. Method as claimed in claim 1, wherein the viscous gelling agent comprises about 1.0 to 8.0% by weight alginate.
18. Method as claimed in claim 1, wherein in the strengthening step e) the liquid strengthening agent is at least one selected from the group consisting of an enzymatic solution and/or a cross-linker.
19. Method as claimed in claim 1, wherein the processing of food particles comprises the extrusion of a food dough.
20. Method for preparing food products by means of extrusion as claimed in claim 19, wherein during processing step d) the treated viscous gelling agent at least partially encloses the strand of food dough.

21. Method for preparing food products by means of extrusion as claimed in claim 19, wherein during processing step d) the viscous gelling agent is at least partially mixed with the strand of food dough.

22. Method as claimed in claim 1, wherein the processing of food particles comprises the portioning of food products.

23. Method as claimed in claim 1, wherein the processing of food particles comprises the assembling of food particles.

24. Method for preparing food products by means of assembling food particles as claimed in claim 23, wherein during processing step d) the treated viscous gelling agent is binding the food particles.

25. Method as claimed in claim 1, wherein the processing of food particles comprises the injection of food particles with the treated viscous gelling agent.

26. Method as claimed in claim 1, wherein at least one electric property of the food particles is measured and wherein the results are subsequently used for automated adaptation of the addition properties of the acidic buffer solution used during processing step c).

27. Method as claimed in claim 1, wherein the mechanical strength of the food particles is measured and wherein the results subsequently are used for automated adaptation of the properties of the acidic buffer solution used during processing step c).

28. Method as claimed in claim 1, wherein the food particles are brought in contact with the viscous gelling agent during processing step d) in multiple stages.

29. Method as claimed in claim 1, wherein the processing steps a)-d) occur in immediate succession.

30. Method as claimed in claim 1, wherein the method further comprising a brining step wherein the exterior of the food product is treated with an aqueous salt solution.

31. A food product obtained by the method as claimed in claim 1.

32. Use of a buffer solution for stabilizing a viscous gelling agent in the method as claimed in claim 1, wherein the buffer solution has a pH of about 3.0 to 6.0.

33. Method as claimed in claim 23, wherein before processing step d) the treated viscous gelling agent is binding the food particles.

34. Method as claimed in claim 7, wherein the liquid strengthening agent is added to the viscous gelling agent after the gelling agent is brought in contact with the food particles.

35. Method as claimed in claim 11, wherein the concentration of potassium substantially corresponds with the concentration of potassium in the food particles.

36. Method as claimed in claim 13, wherein in the stabilizing step f) the acidic stabilizing solution is at least one selected from the group consisting of an enzymatic solution and a cross-linker.

37. Method as claimed in claim 1, wherein at least one electric property of the viscous gelling agent is measured and wherein the results are subsequently used for automated adaptation of the addition properties of the acidic buffer solution used during processing step c).

38. Method as claimed in claim 1, wherein the mechanical strength of the viscous gelling agent is measured and wherein the results subsequently are used for automated adaptation of the properties of the acidic buffer solution used during processing step c).

* * * * *